United States Patent
Wang

(10) Patent No.: US 10,757,788 B2
(45) Date of Patent: Aug. 25, 2020

(54) ILLUMINATING LAMP

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 0 days.

(21) Appl. No.: 16/543,837

(22) Filed: Aug. 19, 2019

(65) Prior Publication Data
US 2019/0380189 A1 Dec. 12, 2019

Related U.S. Application Data

(63) Continuation of application No. PCT/CN2018/077738, filed on Mar. 1, 2018, and a continuation of application No. PCT/CN2018/081693, filed on Apr. 3, 2018.

(30) Foreign Application Priority Data

Mar. 1, 2017 (CN) .................... 2017 2 0193200 U
Apr. 6, 2017 (CN) .................... 2017 2 0354457 U

(51) Int. Cl.
| | |
|---|---|
| H05B 45/10 | (2020.01) |
| H05B 47/11 | (2020.01) |
| F21V 23/00 | (2015.01) |
| H05B 47/105 | (2020.01) |
| F21V 23/04 | (2006.01) |
| H05B 47/16 | (2020.01) |
| F21Y 115/10 | (2016.01) |

(52) U.S. Cl.
CPC ......... *H05B 47/105* (2020.01); *F21V 23/009* (2013.01); *F21V 23/0464* (2013.01); *F21V 23/0471* (2013.01); *H05B 47/11* (2020.01); *H05B 47/16* (2020.01); *F21Y 2115/10* (2016.08)

(58) Field of Classification Search
CPC ........ H05B 45/00; H05B 45/10; H05B 45/20; H05B 47/00; H05B 47/105; H05B 47/11; H05B 47/16; F21V 23/009; F21V 23/0464; F21V 23/0471; F21Y 2115/10
See application file for complete search history.

(56) References Cited

U.S. PATENT DOCUMENTS

| | | | |
|---|---|---|---|
| 7,985,004 B1 * | 7/2011 | Schach | F21S 8/083 362/276 |
| 2011/0175533 A1 * | 7/2011 | Holman | F21V 33/006 315/130 |
| 2016/0240056 A1 * | 8/2016 | Chen | H05B 45/10 |

FOREIGN PATENT DOCUMENTS

| | | |
|---|---|---|
| CN | 201561377 U | 8/2010 |
| CN | 202696973 U | 1/2013 |
| CN | 103471027 A | 12/2013 |
| CN | 204042796 U | 12/2014 |
| CN | 204629280 U | 9/2015 |
| CN | 204810596 U | 11/2015 |

(Continued)

*Primary Examiner* — Jimmy T Vu
(74) *Attorney, Agent, or Firm* — The Webb Law Firm

(57) ABSTRACT

An illuminating lamp includes a box-shaped casing, a plurality of LED light-emitting elements disposed on a light-emitting surface of the box-shaped casing, a conducting wire and an electrical plug for connecting a power source, and a selector switch panel for functional operation disposed on a nonlight-emitting surface of the box-shaped casing. A transparent or semi-transparent outer protective cover is disposed outside the light-emitting surface of the box-shaped casing. A control device including a plurality of control units is disposed in the box-shaped casing.

16 Claims, 4 Drawing Sheets

(56) References Cited

FOREIGN PATENT DOCUMENTS

| | | |
|---|---|---|
| CN | 204859722 U | 12/2015 |
| CN | 205174090 U | 4/2016 |
| CN | 205584534 U | 9/2016 |
| CN | 205782729 U | 12/2016 |
| CN | 205830108 U | 12/2016 |
| CN | 106332354 A | 1/2017 |
| CN | 206770998 U | 12/2017 |
| CN | 206771069 U | 12/2017 |
| GB | 2530298 B | 10/2017 |
| KR | 101559435 B1 | 10/2015 |

\* cited by examiner

ILLUMINATING LAMP

CROSS-REFERENCE TO RELATED APPLICATIONS

This application is a United States continuation patent application of International Application Nos. PCT/CN2018/077738 filed Mar. 1, 2018, and PCT/CN2018/081693 filed Apr. 3, 2018, and claims priority to Chinese Patent Application Nos. 201720193200.2 filed Mar. 1, 2017, and 201720354457.1 filed Apr. 6, 2017, the disclosures of which are hereby incorporated by reference in their entirety.

TECHNICAL FIELD

The present disclosure relates to an LED illuminating lamp for convenient indoor and outdoor use.

BACKGROUND

In people's daily lives and business operations, there is a growing demand for lighting devices with intelligent automatic control. For LED (Light Emitting Diode) indoor or outdoor lighting devices of a new generation, products having more intelligent automatic control performance are largely expected.

SUMMARY

The present disclosure provides an illuminating lamp comprising a box-shaped casing, a plurality of LED light-emitting elements disposed on a light-emitting surface of the box-shaped casing, a conducting wire for connecting a power source being disposed on a nonlight-emitting surface of the box-shaped casing, an electrical plug for introducing the power source disposed on an outer end of the conducting wire for connecting the power source, and a transparent or semi-transparent outer protective cover disposed in close vicinity to and outside the light-emitting surface of the box-shaped casing, wherein a control device comprising a plurality of control units is disposed within the box-shaped casing, the plurality of control units comprising:

1) a control unit that controls turn-on of illuminating of the illuminating lamp by detecting a moving object through microwave emission;

2) a control unit that reduces an illumination intensity of the illuminating lamp after lapse of a set time-delay period in a case where no moving object is detected;

3) a control unit that turns off the illuminating after lapse of a set time-delay period in a case where no moving object is detected;

4) a control unit that controls turn-on-and-off of the illuminating by detecting an illumination intensity in a surrounding environment; and 5) a control unit that controls a percentage of an illumination intensity of the illuminating lamp; and wherein a microwave emission device of each of the control unit that controls turn-on of the illuminating of the illuminating lamp by detecting a moving object through microwave emission, the control unit that reduces an illumination intensity of the illuminating lamp after lapse of a set time-delay period in a case where no moving object is detected, and the control unit that turns off the illuminating after lapse of a set time-delay period in a case where no moving object is detected, is disposed on the light-emitting surface of the box-shaped casing.

The present disclosure further provides an illuminating lamp comprising a box-shaped casing, a plurality of LED light-emitting elements being disposed on a light-emitting surface of the box-shaped casing, a conducting wire for connecting a power source being disposed on a nonlight-emitting surface of the box-shaped casing, an electrical plug for introducing the power source being disposed on an outer end of the conducting wire for connecting the power source, a transparent or semi-translucent outer protective cover being disposed in close vicinity to and outside the light-emitting surface of the box-shaped casing, wherein a control device comprising a plurality of control units is disposed within the box-shaped casing, the plurality of control units comprising:

a control unit that controls turn-on-and-off of illuminating of the illuminating lamp by detecting a moving object through microwave emission;

a control unit that turns off the illuminating after lapse of a set time-delay period in a case where no moving object is detected;

a control unit that controls turn-on-and-off of the illuminating by detecting an illumination intensity in a surrounding environment; and a control unit that controls a percentage of an illumination intensity of the illuminating lamp, and wherein a microwave emission device of each of the control unit that controls turn-on-and-off of the illuminating of the illuminating lamp by detecting a moving object through microwave emission and the control unit that turns off the illuminating after lapse of a set time-delay period in a case where no moving object, is detected is disposed on the light-emitting surface of the box-shaped casing.

The illuminating lamp provided by the disclosure can turn on or turn off illuminating in response to conditions such as "someone or no one is detected", "an illumination intensity in a surrounding environment", "a standby time delay in a case where no one is detected", and is economic in energy and convenient for use.

DETAILED DESCRIPTION OF EMBODIMENTS

Figure 1:
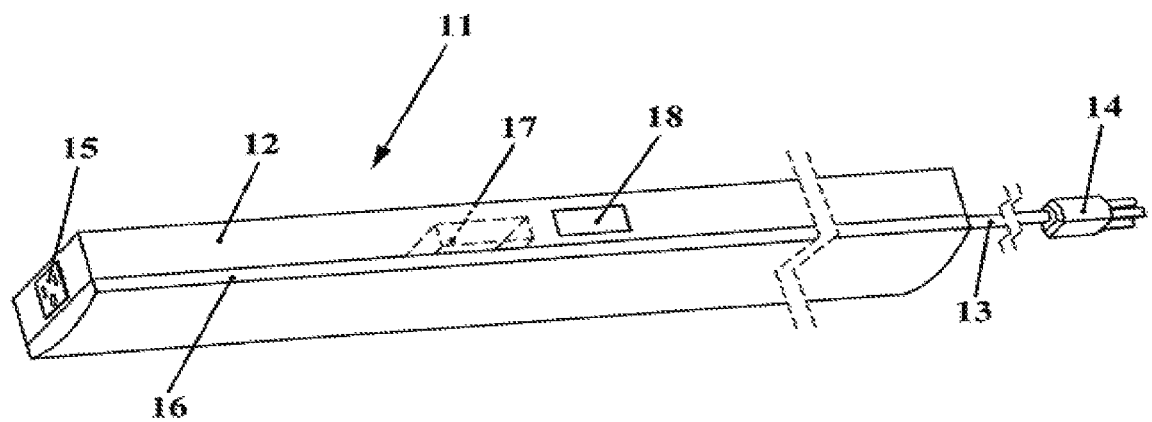
FIG. 1 is an overall schematic diagram of an illuminating lamp of the disclosure.

FIG. 1 is an overall schematic diagram of an illuminating lamp 11 of the present disclosure. The illuminating lamp 11 includes a box-shaped casing 12 and a plate-like outer protective cover 16. A control device 17 is provided in the box-shaped casing 12, a plurality of control units are included in the control device 17, and the plurality of control units may include:

a) a control unit that controls turn-on of illuminating of the illuminating lamp by detecting a moving object through microwave emission. For example, one of transmitting or receiving devices 21 is utilized. A sensible distance to sense a moving object is adjusted, and the sensible distance is divided into four levels of "near", "relatively near", "relatively far", and "far" (such as 1-3 meters, 3-5 meters, 5-8 meters, and 8-12 meters). In an embodiment, a control unit that controls turn-on of illuminating of the illuminating lamp by detecting a moving object through microwave emission may be used to control both turn-on and turn-off of the illuminating of the illuminating lamp.

b) a control unit that reduces an illumination intensity of the illuminating lamp after lapse of a set time-delay period in a case where no moving object is detected. The set time-delay period includes four levels of "null", "relatively short", "relatively long", and "long" (such as null, 30 seconds, 10 minutes, and 30 minutes). An extent to "reduce the illumination intensity" is preset within the control unit, for example, the illumination intensity is reduced to 50% of a maximum illumination intensity of the illuminating lamp. When a moving object is detected again, the illuminating lamp will be turned on again.

c) a control unit that turns off the illuminating after lapse of a set time-delay period in a case where no moving object is detected. The set time-delay period includes four levels of "null", "relatively short", "relatively long", and "long") (such as null, 30 seconds, 10 minutes, and 30 minutes). When a moving object is detected again, the illuminating lamp will be turned on again.

d) a control unit that controls turn-on-and-off of the illumination by detecting an illumination intensity in a surrounding environment. A set illumination intensity of the surrounding environment includes four levels of "null", "cloudy", "dim", and "dark". The level of "null" means that turn-on or turn-off of the illuminating lamp is not influenced by the illumination intensity in the surrounding environment.

e) a control unit that controls a percentage of an illumination intensity of the illuminating lamp, i.e., a percentage of the emitted illumination intensity of the illuminating lamp when the illuminating lamp is turned on. For example, the percentage may be set to 25%, 50%, 75%, or 100%.

A conducting wire 13 for connecting a power source is disposed on a nonlight-emitting surface of the box-shaped casing 12, and an electrical plug 14 for introducing the power source is provided on an outer end of the conducting wire for connecting the power source. A power socket 15 that is parallelly connected to the power source to output power may be disposed on another nonlight-emitting surface of the box-shaped casing 12 (as shown in FIG. 1, the conducting wire 13 for the power source and the power socket 15 that is parallelly connected to the power source to output power are located on both ends of the elongated box-shaped casing 12, respectively). When a building is to be equipped with multiple illuminating lamps, the power socket 15 facilitates successive access of other illuminating lamps into the power source, and is convenient to be installed and saves cost.

A selector switch panel 18 is provided on still another nonlight-emitting surface of the box-shaped casing 12, and the selector switch panel 18 is provided with a plurality of selector switch toggles that control respective control units for manually setting an operation state of each control unit.

Figure 2:
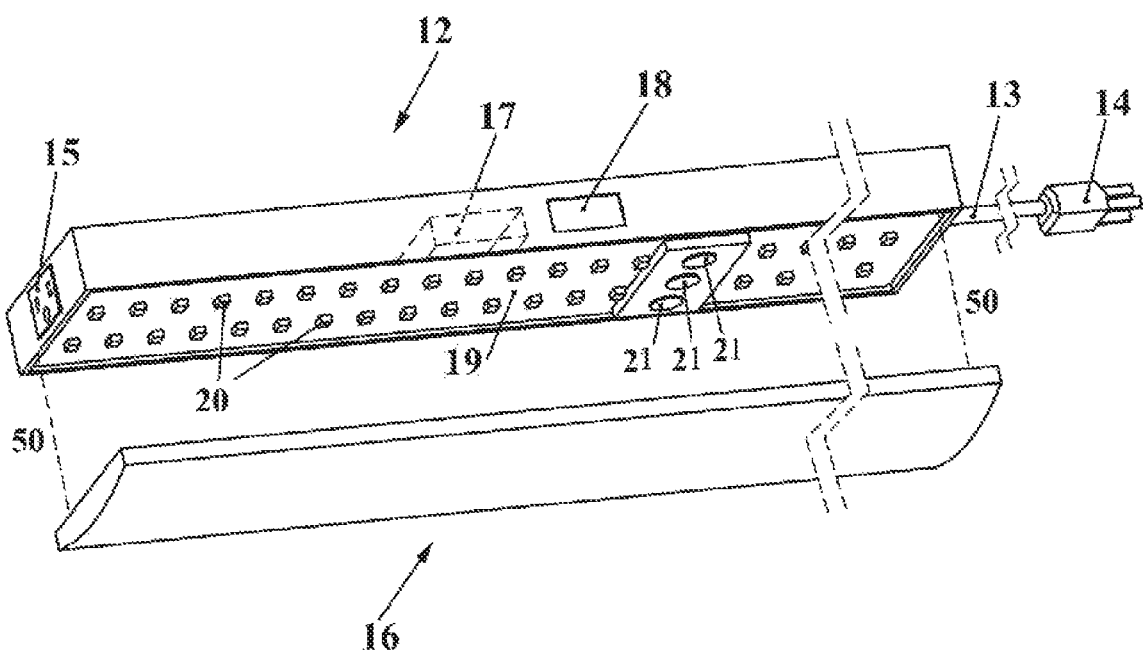
FIG. 2 is a schematic diagram illustrating an interior of the illuminating lamp of the disclosure.

FIG. 2 is a schematic diagram illustrating an interior of the illuminating lamp of the disclosure. This diagram illustrates a light-emitting surface 19 of the box-shaped casing 12. A plurality of LED (Light Emitting Diode) light-emitting elements 20 are disposed on the light-emitting surface 19, and the light-emitting elements 20 emit light toward a side on which illuminating is desired. A number of transmitting or receiving devices 21 for microwave transmission or remote control reception (the number of the transmitting or receiving devices 21 in an example of FIG. 2 is 3, but the number may be set as needed) required for the control units are disposed in a part of an area of the light-emitting surface 19, and are provided according to a specific design.

The outer protective cover 16 is used to transmit light emitted by the LEDs and signals transmitted or received by respective transmitting or receiving devices 21, and to protect the light-emitting surface 19 from being damaged. The outer protective cover 16 is made of a material that is transparent, or made of a semi-transparent or partially-transparent material to prevent glare, or may be made into a specific color.

As shown in FIG. 2, the outer protective cover 16 is snapped onto the light-emitting surface 19 of the box-shaped casing 12 as indicated by a dotted line 50.

Figure 3:
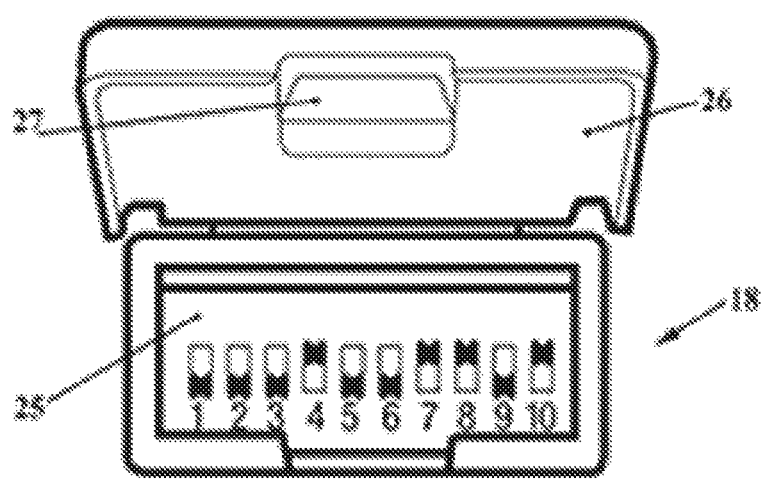
FIG. 3 is a schematic diagram illustrating an example of a selector switch panel used in the illuminating lamp of the disclosure.

FIG. 3 is a schematic diagram illustrating an example of a selector switch panel 18 used in the illuminating lamp of the disclosure. The selector switch panel 18 according to the example has ten toggle switches numbered 1 to 10. The ten toggle switches are divided into five groups that correspond to the above five control units, respectively. The selector switch panel 18 includes a panel surface 25, a hinge-like protective cover 26 and a snap latch 27.

Another embodiment of the disclosure resides in that the plurality of LED light-emitting elements 20 disposed on the light-emitting surface 19 include at least two types of LEDs that emit a white light of different cold-warm tones and are in an even mixed arrangement, wherein one type of LEDs emit a white light of a cold tone, and the other type of LEDs emit a white light of a warm tone.

It is also possible to provide the following control unit in the illuminating lamp:

f) a control unit (i.e., a circuit device) that controls a cold-warm tone of the white light emitted by the LEDs by controlling a switching time of a power switch of the illuminating lamp. For example, if the currently emitted light is of a cold tone, after the power source is turned off and then turned on again in 3 seconds, the emitted light will be changed into a warm tone; if the power source is turned off again and then turned on in 3 seconds, the emitted light will be changed into an average tone between the warm tone and the cold tone . . . and can be changed similarly. Other variation formats can also be designed.

The selector switch panel 18 used in the illuminating lamp of the disclosure is disposed on a body of the illuminating lamp. If the illuminating lamp is mounted at a high position, it would be inconvenient to modify or change a predetermined scheme.

Still another embodiment of the disclosure may adopt:

g) an infrared remote control device and a separate remote controller (not shown), and a receiving device 21 for receiving an infrared remote control signal is disposed on the light-emitting surface 19 of the box-shaped casing 12.

The remote control of a yet still another embodiment of the disclosure is achieved by:

h) a Bluetooth modular control unit operated by a smart phone. Variables of the illuminating lamp are controlled through an operation of the smartphone.

Hereinafter, setting and operation of the toggle switches of Examples 1, 2, 3, and 4 of the disclosure are illustrated in FIGS. 4, 5, 6 and 7, respectively.

Figure 4:
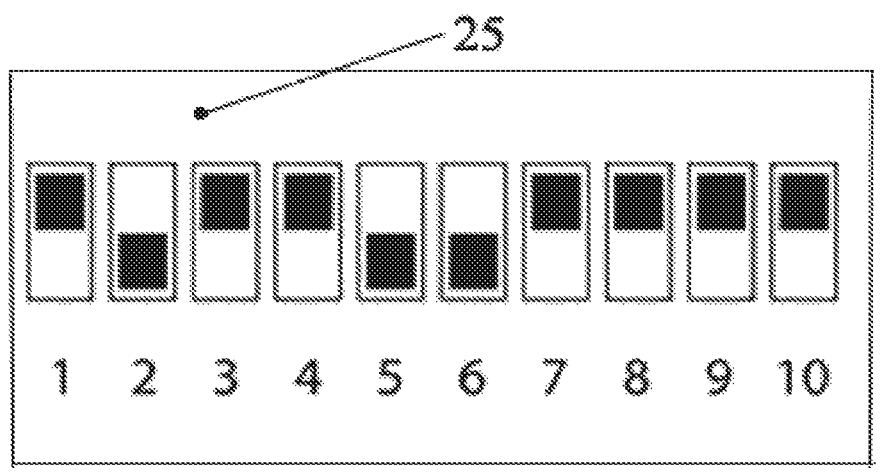
FIGS. 4-7 are schematic diagrams illustrating operation examples of the selector switch panel of the disclosure.

The setting of the toggle switches of Example 1 is shown in FIG. 4. Ten toggle switches (numbered 1 to 10) are divided into five groups, serial numbers, functions and operations of which are described below.

Group 1 includes toggle switches 1 and 2, which collectively have four positions including a first position of the toggle switch 1, a second position of the toggle switch 1, a first position of the toggle switch 2, and a second position of the toggle switch 2, and the control unit in Group 1 is "a control unit (a microwave sensing device) that controls at least one of turn-on and turn-off of illuminating of the illuminating lamp by detecting a moving object through microwave emission" (for example, one of the transmitting or receiving devices 21 is utilized); a sensible distance to sense a moving object is adjusted, and the sensible distance is divided into four levels of "near", "relatively near", "relatively far", and "far" (such as 1-3 meters, 3-5 meters, 5-8 meters, and 8-12 meters); the toggles of Group 1 shown as an example in FIG. 4 are positioned at the level of "relatively near" (such as 3-5 meters), and may also be set to other levels.

Group 2 includes toggle switches 3 and 4, which also collectively have four positions, and the control unit in Group 2 is "a control unit that reduces an illumination intensity of the illuminating lamp after lapse of a set time-delay period in a case where no moving object is detected". The set time-delay period includes four levels of "null", "relatively short", "relatively long", and "long") (such as null, 30 seconds, 10 minutes, and 30 minutes). The toggles of Group 2 shown as an example in FIG. 4 are positioned at the level of "long" (such as 30 minutes), and may also be set to other levels. An extent to "reduce the illumination intensity" is preset within the control unit, for example, the illumination intensity is reduced to 50% of a maximum illumination intensity of the illuminating lamp. When a moving object is detected again, the illuminating lamp will be turned on again.

Group 3 includes toggle switches 5 and 6, which also collectively have four positions, and the control unit in Group 3 is "a control unit that controls turn-on-and-off of the illuminating of the illuminating lamp by detecting an illumination intensity in a surrounding environment". The set illumination intensity in the surrounding environment includes four levels of "null", "cloudy", "dim", and "dark". The toggles of Group 3 shown as an example in FIG. 4 are positioned at the level of "null", which means turn-on or turn-off of the illuminating lamp is not influenced by the illumination intensity in the surrounding environment, and may also be set to other levels.

Group 4 includes toggle switches 7 and 8, which also collectively have four positions, and the control unit in Group 4 functions to control "a percentage of the illumination intensity of the illuminating lamp when the illuminating lamp is turned on". The percentage may be set to 25%, 50%, 75%, or 100%. The toggles of Group 4 shown as an example in FIG. 4 are positioned at the level of "100%", that is, a maximum illumination intensity, and may also be set to other levels.

Group 5 includes toggle switches 9 and 10, which also collectively have four positions, and the control unit in Group 5 functions to "turn off the illuminating lamp after lapse of a set time-delay period in a case where no moving object is detected". The set time-delay period includes four levels of "null", "relatively short", "relatively long", and "long") (such as null, 30 seconds, 10 minutes, and 30 minutes). The toggles of Group 5 shown in FIG. 4 are positioned at the level of "long" (such as 30 minutes), and may also be set to other levels. When a moving object is detected again, the illuminating lamp will be turned on again.

Figure 5:
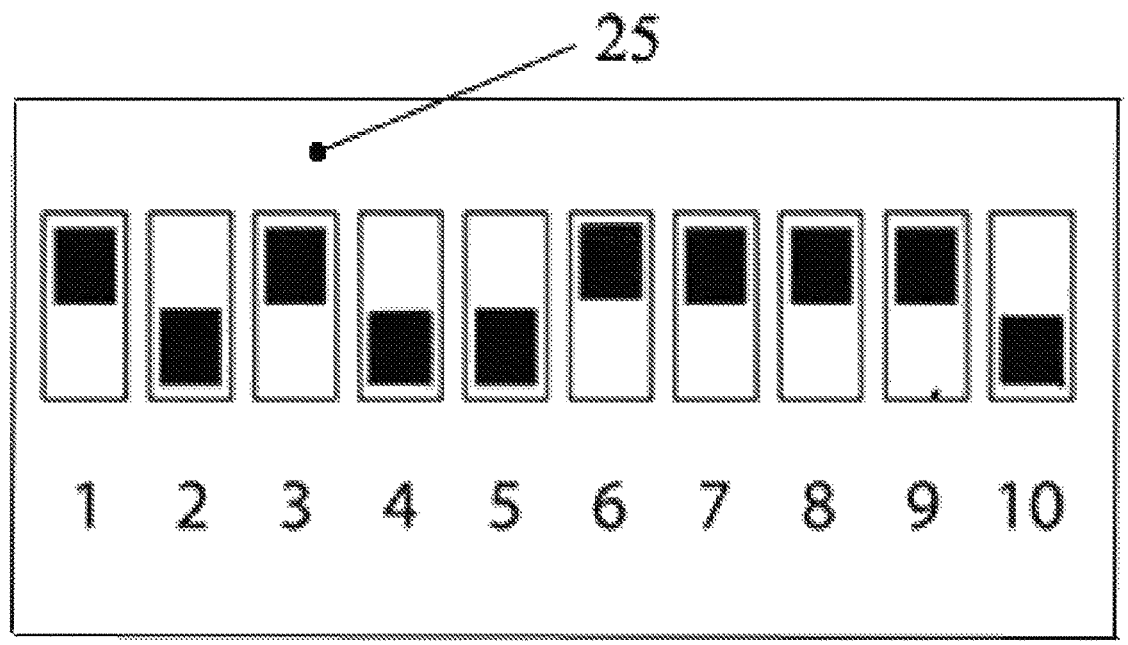

The setting of the toggle switches of Example 2 is shown in FIG. 5. Ten toggle switches (numbered 1 to 10) are divided into five groups, serial numbers, functions and operations of which are described below.

In Group 1, with reference to Example 1, the toggles shown in FIG. 5 are also positioned at the level of "relatively near" (such as 3-5 meters). That is, a distance within which a moving object can be sensed by the microwave sensing device is 3-5 meters.

In Group 2, with reference to Example 1, the toggles shown in FIG. 5 are positioned at the level of "relative short" (such as 30 seconds). That is, "the illumination intensity of the illuminating lamp is reduced to a preset percentage after lapse of 30 seconds in a case where no moving object is detected". When a moving object is detected again, the illuminating lamp will be turned on again.

In Group 3, with reference to Example 1, the toggles shown in FIG. 5 are positioned at the level of "dim", that is, the illuminating lamp will be turned on when the illumination intensity in the surrounding environment is "dim" and a moving object is detected.

In Group 4, with reference to Example 1, the toggles shown in FIG. 5 are positioned at the level of "100%". That is, the illumination intensity of the light emitted by the illuminating lamp is the maximum illumination intensity.

In Group 5, with reference to Example 1, the toggles shown in FIG. 5 are positioned at the level of "relative long" (such as 10 minutes). That is, the illuminating lamp will be turned off after lapse of a set time-delay period of 10 minutes in a case where no moving object is detected. When a moving object is detected again, the illuminating lamp will be turned on again.

Figure 6:
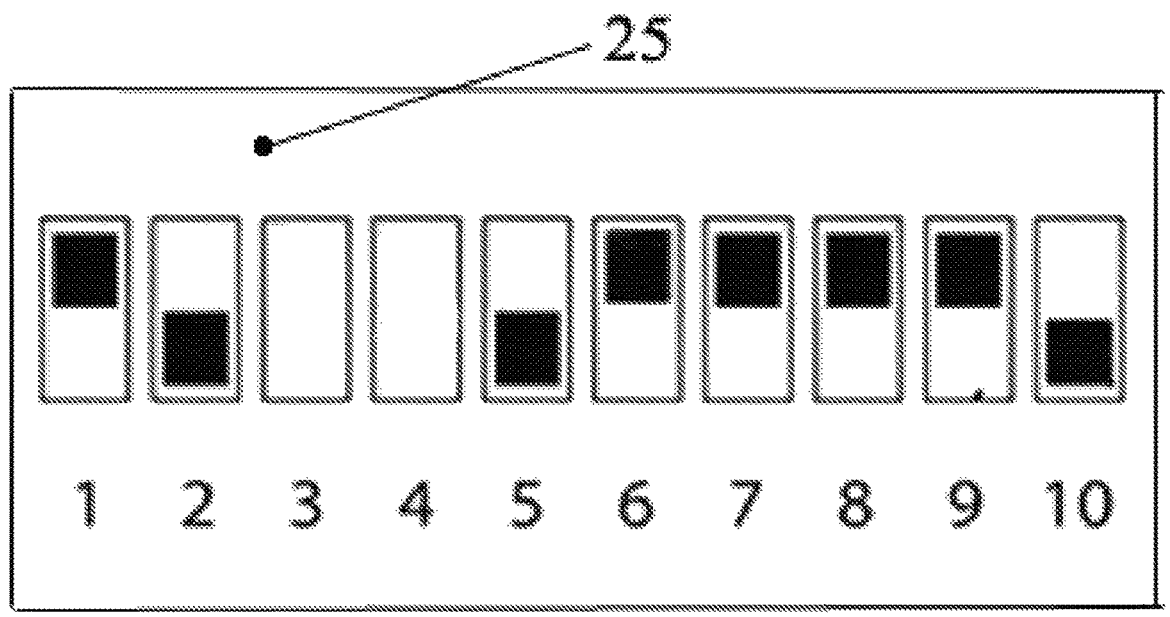

The setting of the toggle switches of Example 3 is shown in FIG. 6. Ten toggle switches (numbered 1 to 10) are divided into five groups, serial numbers, functions and operations of which are described below.

In Group 1, with reference to Example 1, the toggles shown in FIG. 6 are also positioned at the level of "relatively near" (such as 3-5 meters). That is, a distance within which a moving object can be sensed by the microwave sensing device is 3-5 meters.

In Group 2, the toggles are positioned at the level of "null" in this example. That is, no function is set for the toggles (i.e., they do not function).

In Group 3, with reference to Example 1, the toggles shown in FIG. 6 are positioned at the level of "dim", that is, the illuminating lamp will be turned on when the illumination intensity in the surrounding environment is "dim" and a moving object is detected.

In Group 4, with reference to Example 1, the toggles shown in FIG. 6 are positioned at the level of "100%". That is, the illumination intensity of the light emitted by the illuminating lamp is the maximum illumination intensity.

In Group 5, with reference to Example 1, the toggles shown in FIG. 6 are positioned at the level of "relatively long" (such as 10 minutes). That is, the illuminating lamp will be turned off after lapse of a set time-delay period of 10 minutes in a case where no moving object is detected. When a moving object is detected again, the illuminating lamp will be turned on again.

In Example 3, there are four groups of toggles that actually function. Of course, toggles with other number of groups may also be adopted.

Figure 7:
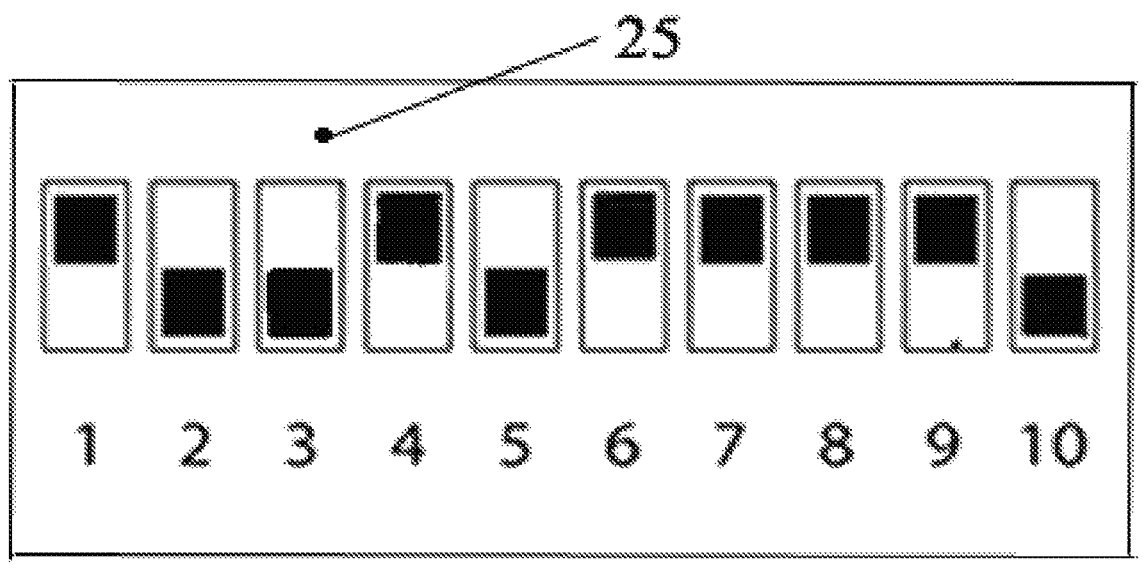

The setting of the toggle switches of Example 4 is shown in FIG. 7. Ten toggle switches (numbered 1 to 10) are divided into five groups, serial numbers, functions and operations of which are described below.

In Group 1, with reference to Example 1, the toggles shown in FIG. 7 are also positioned at the level of "relatively near" (such as 3-5 meters). That is, a distance within which a moving object can be sensed by the microwave sensing device is 3-5 meters.

In Group 2, in this example, the control unit of the control device is a control unit that controls a cold-warm tone of a white light emitted by the LED light-emitting elements. The plurality of LED light-emitting elements 20 disposed on the light-emitting surface 19 include at least two types of LEDs that emit a white light of different cold-warm tones and are in an even mixed arrangement, wherein one type of LEDs emit a white light of a cold tone, and the other type of LEDs emit a white light of a warm tone. A tone of a mixed light is adjustable through intensities of respective lights, and is divided into four levels of "cold", "relatively cold", "relatively warm", and "warm". The example shown in FIG. 7 is set to the level of "relatively warm", and may also be set to other levels.

In Group 3, with reference to Example 1, the toggles shown in FIG. 7 are positioned at the level of "dim", that is, the illuminating lamp will be turned on when the illumination intensity in the surrounding environment is "dim" and a moving object is detected.

In Group 4, with reference to Example 1, the toggles shown in FIG. 7 are positioned at the level of "100%". That is, the illumination intensity of the light emitted by the illuminating lamp is the maximum illumination intensity.

In Group 5, with reference to Example 1, the toggles shown in FIG. 7 are positioned at the level of "relatively long" (such as 10 minutes). That is, the illuminating lamp will be turned off after lapse of a set time-delay period of 10 minutes in a case where no moving object is detected. When a moving object is detected again, the illuminating lamp will be turned on again.

As described above, the plurality of selector switch toggles of the selector switch panel are divided into multiple groups, and a sensible distance for sensing the moving object, the time-delay period after lapse of which the illuminating of the illuminating lamp will be turned off in the case where no moving object is detected, the illumination intensity in the surrounding environment or the percentage of the illumination intensity of the illuminating lamp when the illuminating lamp is turned on is set by a combination of states of the selector switch toggles in each group. Apparently, the time-delay period after lapse of which the illumination intensity of the illuminating lamp will be reduced in the case where no moving object is detected, may also be set by the combination of the states of the selector switch toggles in each group. Similarly, the cold-warm tone of the white light emitted by the LEDs may also be set by the combination of the states of the selector switch toggles in each group.

In a similar way, many other operation setting manners are possible.

The selector switch panel 18 used in the illuminating lamp of the disclosure is disposed on the body of the illuminating lamp. If the illuminating lamp is mounted at a high position, it would be inconvenient to modify or change a predetermined scheme. It is possible to use an additional infrared remote controller to perform remote control. For example, one of the transmitting or receiving devices 21 shown in FIG. 2 receives an infrared remote control signal.

Another kind of remote control is achieved by using a smart phone. A Bluetooth modular control unit is additionally disposed in the control device, and the variables of the illuminating lamp are controlled through an operation of the smart phone.

The invention claimed is:

1. An illuminating lamp comprising a box-shaped casing, a plurality of LED light-emitting elements disposed on a light-emitting surface of the box-shaped casing, a conducting wire for connecting a power source being disposed on a nonlight-emitting surface of the box-shaped casing, an electrical plug for introducing the power source disposed on an outer end of the conducting wire for connecting the power source, and a transparent or semi-transparent outer protective cover being disposed in close vicinity to and outside the light-emitting surface of the box-shaped casing, wherein a control device comprising a plurality of control units is disposed within the box-shaped casing, the plurality of control units comprising:
a) a control unit that controls turn-on of illuminating of the illuminating lamp by detecting a moving object through microwave emission;
b) a control unit that reduces an illumination intensity of the illuminating lamp after lapse of a set time-delay period in a case where no moving object is detected;
c) a control unit that turns off the illuminating after lapse of the set time-delay period in the case where no moving object is detected;
d) a control unit that controls turn-on-and-off of the illuminating by detecting an illumination intensity in a surrounding environment; and
e) a control unit that controls a percentage of an illumination intensity of the illuminating lamp; and
wherein a microwave emission device of each of the control unit that controls turn-on of the illuminating of the illuminating lamp by detecting the moving object through microwave emission, the control unit that reduces the illumination intensity of the illuminating lamp after lapse of the set time-delay period in the case where no moving object is detected, and the control unit that turns off the illuminating after lapse of the set time-delay period in the case where no moving object is detected, is disposed on the light-emitting surface of the box-shaped casing.

2. The illuminating lamp according to claim 1, wherein the plurality of LED light-emitting elements comprise two types of LEDs that emit a white light of different cold-warm tones and are in an even mixed arrangement, and the plurality of control units of the control device further comprise: f) a control unit that controls a cold-warm tone of the white light emitted by the LEDs by controlling a switching time of a power switch of the illuminating lamp.

3. The illuminating lamp according to claim 1, wherein the plurality of control units of the control device further comprise: g) an infrared remote control device and a separate remote controller, and a receiving device for receiving an infrared remote control signal disposed on the light-emitting surface of the box-shaped casing.

4. The illuminating lamp according to claim 1, wherein the plurality of control units of the control device further comprise: h) a Bluetooth modular control unit operated by a smart phone.

5. The illuminating lamp according to claim 1, wherein a power socket that is parallelly connected to the power source to output power is further disposed on the nonlight-emitting surface of the box-shaped casing.

6. The illuminating lamp according to claim 1, wherein a selector switch panel is further disposed on the non light-emitting surface of the box-shaped casing, and the selector switch panel is provided with a plurality of selector switch toggles that control the control units.

7. An illuminating lamp comprising a box-shaped casing, a plurality of LED light-emitting elements disposed on a light-emitting surface of the box-shaped casing, a conducting wire for connecting a power source disposed on a nonlight-emitting surface of the box-shaped casing, an electrical plug for introducing the power source being disposed on an outer end of the conducting wire for connecting the power source, and a transparent or semi-translucent outer protective cover disposed in close vicinity to and outside the light-emitting surface of the box-shaped casing, wherein a control device comprising a plurality of control units is disposed within the box-shaped casing, the plurality of control units comprising:

a control unit that controls turn-on-and-off of illuminating of the illuminating lamp by detecting a moving object through microwave emission;

a control unit that turns off the illuminating after lapse of a set time-delay period in a case where no moving object is detected;

a control unit that controls turn-on-and-off of the illuminating by detecting an illumination intensity in a surrounding environment; and a control unit that controls a percentage of an illumination intensity of the illuminating lamp, and wherein a microwave emission device of each of the control unit that controls turn-on-and-off of the illuminating of the illuminating lamp by detecting the moving object through microwave emission and the control unit that turns off the illuminating after lapse of the set time-delay period in the case where no moving object is detected, is disposed on the light-emitting surface of the box-shaped casing.

8. The illuminating lamp according to claim 7, wherein the plurality of control units of the control device further comprise a control unit that reduces the illumination intensity of the illuminating lamp after lapse of the set time-delay period in the case where no moving object is detected.

9. The illuminating lamp according to claim 7, wherein the plurality of LED light-emitting elements comprise at least two types of LEDs that emit a white light of different cold-warm tones and are in an even mixed arrangement, and the plurality of control units of the control device further comprise an additional control unit that controls a cold-warm tone of the white light emitted by the LEDs.

10. The illuminating lamp according to claim 7, wherein the plurality of control units of the control device further comprise an additional infrared remote control device and a separate remote controller, and a receiving device for receiving an infrared remote control signal disposed on the light-emitting surface of the box-shaped casing.

11. The illuminating lamp according to claim 7, wherein the plurality of control units of the control device further comprise an additional Bluetooth modular control unit operated by a smart phone.

12. The illuminating lamp according to claim 7, wherein a power socket that is parallelly connected to the power source to output power is further disposed on a nonlight-emitting surface of the box-shaped casing.

13. The illuminating lamp according to claim 7, wherein a selector switch panel is further disposed on the nonlight-emitting surface of the box-shaped casing, and the selector switch panel is provided with a plurality of selector switch toggles that control the control units.

14. The illuminating lamp according to claim 13, wherein the plurality of selector switch toggles are divided into a plurality of groups, and a sensible distance for sensing the moving object, the time-delay period after lapse of which the illuminating of the illuminating lamp will be turned off in the case where no moving object is detected, the illumination intensity in the surrounding environment or the percentage of the illumination intensity of the illuminating lamp when the illuminating lamp is turned on is set by a combination of states of the selector switch toggles in each group.

15. The illuminating lamp according to claim 13, wherein the plurality of selector switch toggles are divided into a plurality of groups, and the time-delay period after lapse of which the illumination intensity of the illuminating lamp will be reduced in the case where no moving object is detected is set by a combination of states of the selector switch toggles in each group.

16. The illuminating lamp according to claim 13, wherein the plurality of selector switch toggles are divided into a plurality of groups, and a cold-warm tone of a white light emitted by the LEDs is set by a combination of states of the selector switch toggles in each group.

* * * * *